US011027926B2

(12) United States Patent
Vicktorius et al.

(10) Patent No.: US 11,027,926 B2
(45) Date of Patent: Jun. 8, 2021

(54) CONVEYING APPARATUS FOR TRANSPORTING INDIVIDUAL PRODUCTS

(71) Applicant: ESPERA-Werke GmbH, Duisburg (DE)

(72) Inventors: Winfried Vicktorius, Duisburg (DE); Mario Wiegel, Essen (DE)

(73) Assignee: ESPERA-Werke GmbH, Duisburg (DE)

( * ) Notice: Subject to any disclaimer, the term of this patent is extended or adjusted under 35 U.S.C. 154(b) by 0 days.

(21) Appl. No.: 15/760,317

(22) PCT Filed: Jul. 4, 2016

(86) PCT No.: PCT/EP2016/065629
§ 371 (c)(1),
(2) Date: Mar. 15, 2018

(87) PCT Pub. No.: WO2017/050450
PCT Pub. Date: Mar. 30, 2017

(65) Prior Publication Data
US 2018/0297783 A1    Oct. 18, 2018

(30) Foreign Application Priority Data
Sep. 24, 2015  (DE) .................... 10 2015 116 167.2

(51) Int. Cl.
*B65G 21/06*   (2006.01)
*B65G 21/00*   (2006.01)
(Continued)

(52) U.S. Cl.
CPC ............... *B65G 21/06* (2013.01); *B65C 1/02* (2013.01); *B65C 9/02* (2013.01); *B65G 21/00* (2013.01); *B65G 43/00* (2013.01)

(58) Field of Classification Search
CPC .... B65C 1/02; B65C 9/02; B65C 9/40; B65C 2210/0089; B32B 41/00
See application file for complete search history.

(56) References Cited

U.S. PATENT DOCUMENTS

| 5,141,381 A | 8/1992 | Kato et al. |
| 5,490,590 A | 2/1996 | Courtney |
| 2009/0294070 A1* | 12/2009 | Kellhammer ......... B65C 9/0062 156/365 |

FOREIGN PATENT DOCUMENTS

| CN | 101814451 | 8/2010 |
| CN | 104692038 | 6/2015 |

(Continued)

OTHER PUBLICATIONS

Translation of JP H04121309, Fujio Yoshihiko et al, Apr. 22, 1992, Japan. (Year: 1992).*

(Continued)

*Primary Examiner* — George R Koch
(74) *Attorney, Agent, or Firm* — Pauly, DeVries Smith & Deffner LLC

(57) ABSTRACT

The disclosure relates to a conveying apparatus for transporting individual products, having a feed device comprising a transport means for transporting the respective product in a direction of transport which runs at an angle to the direction of gravity, wherein the transport means has a resting surface for the respective product, having a control device comprising at least one electronic component, and having a frame bearing a holder which is movable between an operating position and a maintenance position and which bears at least one electronic component, wherein the at least one electronic component, in the operating position of the holder, is ready for operation. The disclosure proposes that the control device is ready for operation also in the maintenance position. The disclosure also relates to a labeling (Continued)

apparatus having such a conveying apparatus and having an applicator for applying a label to the respective product.

20 Claims, 5 Drawing Sheets

(51) Int. Cl.
*B65G 43/00* (2006.01)
*B65C 1/02* (2006.01)
*B65C 9/02* (2006.01)

(56) References Cited

FOREIGN PATENT DOCUMENTS

| | | |
|---|---|---|
| JP | H04121308 | 4/1992 |
| JP | H04121309 | 4/1992 |
| JP | 2011001730 | 1/2011 |
| WO | 2017050450 | 3/2017 |

OTHER PUBLICATIONS

"International Preliminary Report on Patentability," for PCT Application No. PCT/EP2016/065629 dated Dec. 7, 2017 (5 pages).
"International Search Report and Written Opinion," for PCT Application No. PCT/EP2016/065629 dated Sep. 27, 2016 (14 pages).
Chinese Office Action for Chinese Patent Application No. 201680055661.1 dated May 17, 2019 (10 pages) with English Translation of Search Report.

* cited by examiner

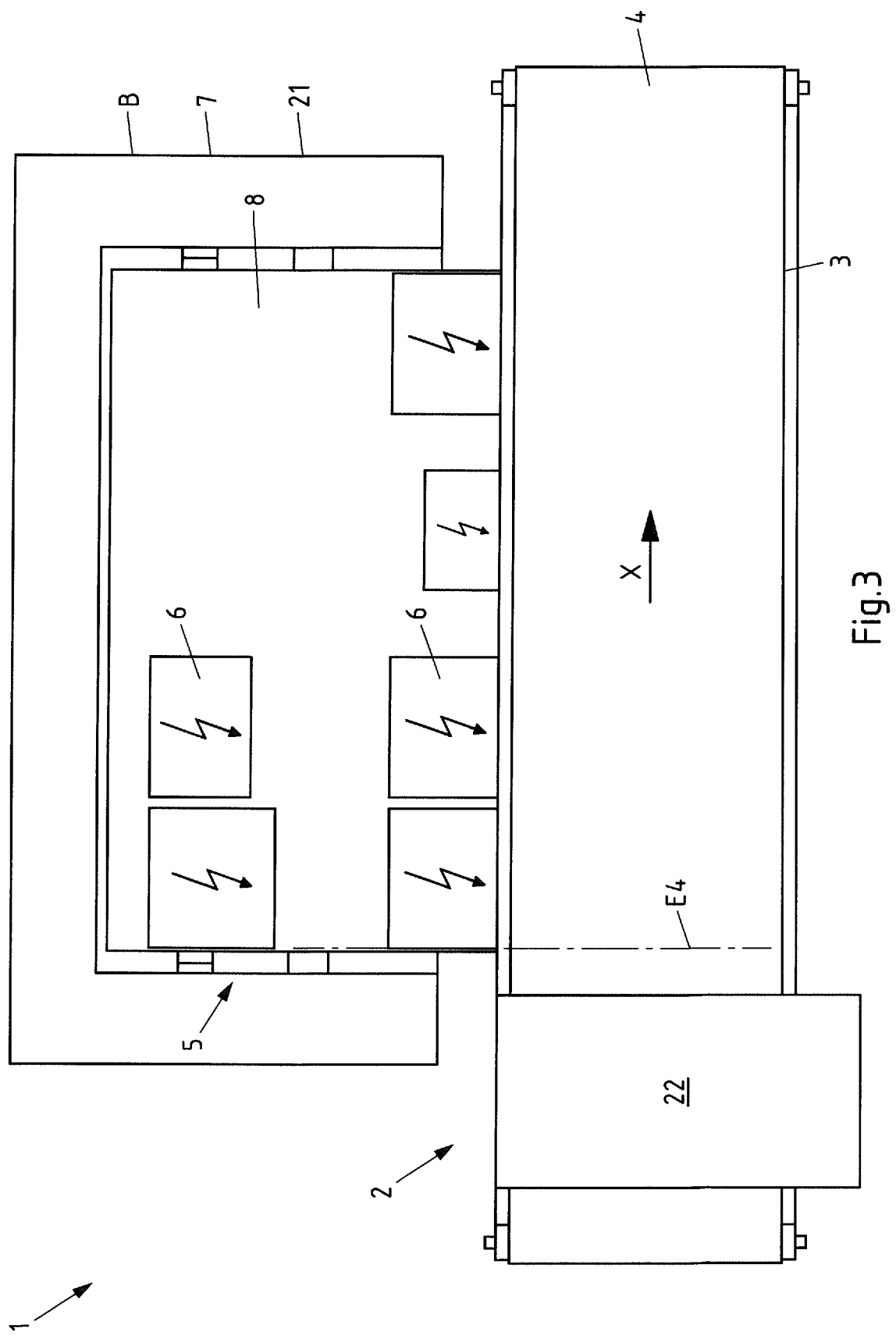

CONVEYING APPARATUS FOR TRANSPORTING INDIVIDUAL PRODUCTS

CROSS-REFERENCE TO RELATED APPLICATIONS

This application is a national stage application under 35 U.S.C. 371 of International Patent Application Serial No. PCT/EP2016/065629, filed Jul. 4, 2016, which claims priority from German Patent Application No. DE 10 2015 116 167.2, filed Sep. 24, 2015, the disclosure of which is incorporated herein by reference.

FIELD OF THE TECHNOLOGY

The present disclosure relates to a conveying apparatus for transporting individual products. The disclosure also relates to a labeling apparatus having such a conveying apparatus and having an applicator for applying a label to the respective product.

BACKGROUND

Conveying apparatuses of the previously defined type are, for instance, a constituent part of labeling apparatuses in which individual products or packages are transported via a conveyor belt and are provided during transport with a printed label. For the controlling of such a conveying apparatus, in particular for the controlling of the speed and timing, the conveying apparatus possesses a control device having one or more electronic components. By an electronic component is understood within the meaning of the present disclosure not only an electronic component, such as a resistor or capacitor or the like, but also an assembly consisting of a plurality of components (electronics assembly). A control device can have a plurality of such electronics assemblies.

An example of such a conveying apparatus is disclosed by JP H04-121309 A. In the known conveying apparatus, at least one electronic component is present within a housing which is borne by the frame of the conveying apparatus. The housing is disposed vertically beneath, that is to say in the direction of gravity beneath, the conveyor belt. Via a downwardly pivotable side flap in the housing, the electronics assemblies therein, in particular the control unit and adjusting unit disposed on the flap, are accessible for adjustment and maintenance works and for inspection purposes.

SUMMARY

A problem with this prior art is, however, that the housing with the electronic components present therein is relatively small and, due to its size and position, the components present therein are relatively poorly accessible.

In such a prior art, the conveying apparatus, for safety reasons, in particular in order to avoid damage to the electronic components, is shut down for adjustment and maintenance works. If the electronic components, as in the previously described prior art, are arranged in a relatively tight space, increased care is called for on the part of the maintenance staff, whereby the time spent on the maintenance works is also increased.

An object of the present disclosure is therefore to provide a conveying apparatus in which adjustment and maintenance means are simplified and downtimes of the conveying apparatus are thereby reduced.

The previously derived and demonstrated object, in a conveying apparatus for transporting individual products, for instance foods, said conveying apparatus
  having a feed device comprising a transport means, for instance a conveyor belt or roller conveying apparatus, for transporting the respective product in a direction of transport which runs at an angle, in particular orthogonally, to the direction of gravity (vertical direction), wherein the transport means has a resting surface for the respective product,
  having a control device comprising at least one electronic component, and
  having a frame bearing a holder which is movable between an operating position and a maintenance position and which bears at least one electronic component, in particular at least one electronics assembly,
wherein the at least one electronic component, in the operating position of the holder, is ready for operation,
is achieved by virtue of the fact that the at least one electronic component is ready for operation also in the maintenance position.

The essence of the present disclosure is thus that the frame with the movable holder is configured such that the at least one electronic component and, in particular, all electronic components of the control device is/are ready for operation also in the maintenance position. "Ready for operation" means within the meaning of the disclosure that the respective electronic component or the control device is fully functional, that is to say can execute all functions which are provided for the control system. According to the disclosure, the movable holder is thus arranged and mounted such that, for the shifting into the maintenance position, no current-carrying lines or contacts, and no data lines or data interfaces, are disconnected, or are isolated in the maintenance position. As is further explained below, the movable holder is shifted, in particular, into a maintenance position, in which an operator can reach the at least one electronic component particularly easily, in particular without having to stoop or kneel down. In this way, the conveying apparatus can be maintained and adjusted particularly easily. Since the control device is ready for operation also in the maintenance position, downtimes are also eliminated in respect of the adjustment and maintenance works, since the conveying apparatus can continue to be operated without significant restrictions.

It should be pointed out that where mention is made of at least one electronic component connected to the movable holder, a plurality of electronic components connected to the movable holder can also be meant. In particular, the electronic component or components which are connected to the holder are constituted by components of the kind which offer adjustment possibilities (adjusting and/or control elements). Additionally or alternatively, it can here be a question of components with which measurements can be conducted (measuring elements) or from which data can be read out or read off (read-out element or display element).

According to one embodiment of the conveying apparatus according to the disclosure, the center of gravity of the at least one electronic component lies, in the operating position, in a first (horizontal) plane orthogonal to the direction of gravity and, in the maintenance position, in a second (horizontal) plane orthogonal to the direction of gravity, which second plane is (vertically) distanced from the first plane counter to the direction of gravity. Alternatively or additionally, the midpoint of that surface of the at least one electronic component which is facing away from the holder lies, in the operating position, in a first (horizontal) plane orthogonal to the direction of gravity and, in the maintenance position, in a second (horizontal) plane orthogonal to the direction of gravity, which second plane is (vertically) distanced from the first plane counter to the direction of gravity. In other words, the center of gravity and/or the midpoint of the surface facing away from holder is, in the respective second horizontal plane, thus in the maintenance position, higher, or distanced vertically further from the ground, than in the respective first horizontal plane, thus the operating position. This makes it possible to arrange the electronic component or components connected to the movable holder, during the normal operation of the conveying apparatus, that is to say in the operating position, in a protected position, in which the components cannot be unintentionally touched and damaged. Through the movement of the holder into the maintenance position, this or these component(s) can be brought into a less protected, elevated position, in which the components, however, are particular easily accessible.

According to a further embodiment of the conveying apparatus according to the disclosure, the holder and/or the at least one electronic component, in particular the center of gravity and/or that surface of the component which is facing away from the holder, lies, in the operating position, mostly, in particular fully, within the outer boundary of the frame and/or, in the maintenance position, mostly, in particular fully, outside the outer boundary of the frame. In this way, it is with simple means ensured that the sensitive electronic components, in the operating position, are particularly well protected and, in the maintenance position, particularly easily reachable.

According to another embodiment, the at least one electronic component lies, in the maintenance position, mostly, in particular fully, vertically above a plane which is orthogonal to the direction of gravity and in which runs the (during operation product-facing) resting surface (top side) of the transport means of the feed device.

In this way, an operator standing in front of the transport means of the feed device can easily reach, over the transport means, the electronic component or components which are connected to the holder residing in the maintenance position. The at least one electronic component is thereby substantially easier to reach than if this were disposed in the region vertically beneath the transport means. Nor does the operator have to make his way to the back of the conveying apparatus in order to reach said at least one electronic component. Since the conveying apparatus does not have to be accessible from the back, it can be installed in a particularly space-saving arrangement in a room, for instance with its back flush against a wall. Nevertheless, the important components of the control device are at all times easily accessible by the particular movable holder.

According to yet another embodiment of the conveying apparatus according to the disclosure, the holder and/or the at least one electronic component lies, in the maintenance position, outside that (vertical) projection of the resting surface of the transport means of the feed device which faces counter to the direction of gravity. In this way, it is ensured that, in the maintenance position, no parts of the holder or of the control device jut into the region in which the individual products are conveyed in the direction of transport. In other words, in the maintenance position, the operation of the conveying apparatus is not disturbed. For optimal accessibility of the at least one electronic component connected to the movable holder, the shortest horizontal distance, thus the shortest distance orthogonal to the direction of gravity, between holder and projection is in particular less than 150 mm, such as less than 100 mm, or such as less than 50 mm.

According to a further embodiment, it is provided that the holder and/or the at least one electronic component, in the maintenance position, lies closer to the transport means than in the operating position. This too ensures that the at least one electronic component, in the maintenance position, can be reached particularly easily by an operator who is standing in front of the transport means and has to reach over this.

According to yet a further embodiment of the conveying apparatus according to the disclosure, the holder is translationally movable and/or pivotable. In particular, the holder, in the maintenance position, is shifted by an angle of 75-105°, such as 80-100°, particularly 85-95°, in relation to the operating position. In some embodiments, the holder, or that surface of the holder on which the at least one electronic component is disposed, points in the operating position in the direction of gravity and/or runs in the maintenance position orthogonally to the direction of gravity.

It should be pointed out that the movement of the holder must not only be a pivot movement, but additionally or alternatively also a longitudinal or parallel displacement of the holder can be realized in the shift between the operating position and the maintenance position. Also, in a pivot movement, the pivot axis does not necessarily have to run through the holder, but can also be distanced from the holder. In particular, this can be a fictitious pivot axis, which is dictated by a specific guidance or mounting of the holder, as is now explained below.

Thus according to a further embodiment of the conveying apparatus according to the disclosure it can be provided that the front end and/or rear end of the holder is movable between the operating position and the maintenance position along a motional path which has at least one curved and/or at least one straight portion, wherein the motional path runs in particular in a plane which runs parallel to the direction of gravity and orthogonally to the direction of transport. By the front end of the holder is meant the end facing in the direction of the shift from the operating position to the maintenance position. The rear end is correspondingly that end of the holder which faces in the direction of the shift from the maintenance position to the operating position. The front and/or rear end can now be guided along said motional paths, wherein the motional path of the front end can also deviate from that of the rear end. In this way, the holder can even in a relatively tight frame be easily be placed in the operating position or moved out of the operating position into the maintenance position. This results in a reduced overall size of the conveying apparatus.

According to another embodiment of the conveying apparatus, the holder is guided, in particular with its rear half, in at least one guide, in particular an at least predominantly, such as completely, straight-running guide. The rear half is that half of the holder which points in the direction of shift from the maintenance position to the operating position. The guide can be constituted by a guide rail, a guide groove or a guide slot. The holder has, for this purpose, a protrusion which cooperates with the guide. In some embodiments, the holder is guided in two such guides, in which case the holder, in particular for each guide, has an own protrusion which cooperates with the respective guide. The guide is here connected, in particular immovably, to the frame.

According to a further embodiment of the conveying apparatus, the holder has at least one guide, in particular an at least predominantly, such as completely, straight-running guide. This guide too can be constituted by a guide rail, a guide groove or a guide slot. In the guide is guided a (therewith mechanically cooperating) guide counterpart, for instance likewise a protrusion, in particular a pin or a roller. The guide counterpart is connected, such as movably, in particular pivotably, to the frame. In some embodiments, the guide counterpart is a pin or a roller, in particular a ball-bearing roller, which is connected to the frame via a lever.

In particular in a combination of the two said guide devices, a motional path for the front and/or rear end of the holder is obtained, which motional path allows the holder to move in a tight space between the operating position and the maintenance position.

According to one more embodiment, a spring acts on the guide counterpart and/or on the lever and/or on the holder and pretensions the guide counterpart or lever or holder in particular in the direction from the operating position to the maintenance position or counter to the direction of gravity. In this way, the movement, in particular the pivoting, of the holder out of the operating position in the direction of the maintenance position is aided. Additionally or alternatively, a motor can also be provided for the support of this movement.

According to yet another embodiment of the conveying apparatus according to the disclosure, the frame has at least one support arm, which bears the transport means of the feed device. This support arm points in particular forward from the rest of the frame. As "at the front" or "front part" of the conveying apparatus is thus defined that part of the conveying apparatus which is formed by the transport means. "At the rear" or "rear part" of the conveying apparatus is then that part in which the movable holder is mounted in the operating position. In some embodiments, in the direction of gravity beneath the transport means of the feed device, with the exception of the at least one support arm, no further components of the frame and/or of the conveying apparatus are arranged. Under the transport means is thus in this case found a free space (air space), whereby cleaning works of the floor beneath the transport means are facilitated.

Finally, according to a further embodiment of the conveying apparatus according to the disclosure, the frame, that is to say the load-bearing components, forms a housing. If the load-bearing components form the housing, by this is meant not that a load-bearing frame is clad with separate cladding elements, but rather the housing walls themselves form the load-bearing elements. The holder and/or the at least one electronic component lies, in the operating position, mostly, in particular fully, within the housing and/or, in the maintenance position, mostly, in particular fully, outside the housing.

The object is further achieved by a labeling apparatus having a conveying apparatus for transporting individual products, as has been previously defined, and having an applicator for applying a label to the respective product.

Various embodiments provide a conveying apparatus for transporting individual products, having a feed device comprising a transport means for transporting the respective product in a direction of transport which runs at an angle, in particular orthogonally, to the direction of gravity, wherein the transport means has a resting surface for the respective product, having a control device comprising at least one electronic component, and having a frame bearing a holder which is movable between an operating position and a maintenance position and which bears at least one electronic component, in which the at least one electronic component, in the operating position of the holder, is ready for operation, wherein the at least one electronic component is ready for operation also in the maintenance position.

In some embodiments, the center of gravity and/or the midpoint of that surface of the at least one electronic component which is facing away from the holder lies, in the operating position, respectively in a first plane orthogonal to the direction of gravity and, in the maintenance position, respectively in a second plane orthogonal to the direction of gravity, which second plane is distanced from the respectively first plane counter to the direction of gravity.

In some embodiments, the holder and/or the at least one electronic component lies, in the operating position, mostly, in particular fully, within the outer boundary of the frame and/or, in the maintenance position, mostly, in particular fully, outside the outer boundary of the frame.

In some embodiments, the at least one electronic component lies, in the maintenance position, mostly, in particular fully, vertically above a plane which is orthogonal to the direction of gravity and in which runs the resting surface of the transport means of the feed device.

In some embodiments, the holder and/or the at least one electronic component lies, in the maintenance position, outside that projection of the resting surface of the transport means of the feed device which faces counter to the direction of gravity, the shortest horizontal distance between holder and projection being in particular less than 150 mm, such as less than 100 mm, or such as less than 50 mm.

In some embodiments, the holder and/or the electronic component, in the maintenance position, lies closer to the transport means than in the operating position.

In some embodiments, the holder is translationally movable and/or pivotable and, in particular, in the maintenance position, is shifted by an angle of 75-105°, such as 80-100°, particularly 85-95°, in relation to the operating position.

In some embodiments, the front end and/or rear end of the holder is movable between the operating position and the maintenance position along a motional path which has at least one curved and/or at least one straight portion, wherein the motional path runs in particular in a plane which runs parallel to the direction of gravity and orthogonally to the direction of transport.

In some embodiments, the holder is guided, in particular with its rear half, in at least one guide, in particular an at least predominantly straight-running guide.

In some embodiments, the guide is connected immovably to the frame.

In some embodiments, the holder has at least one guide, in particular an at least predominantly straight-running guide, in which a guide counterpart is guided.

In some embodiments, the guide counterpart is connected such as movably, in particular pivotably, to the frame.

In some embodiments, the guide counterpart is a pin or a roller, which is connected to the frame via a lever.

In some embodiments, a spring acts on the guide counterpart and/or the lever and/or the holder and pretensions the guide counterpart or lever or holder in particular in the direction from the operating position to the maintenance position or counter to the direction of gravity.

In some embodiments, the frame has at least one support arm, which bears the transport means of the feed device.

In some embodiments, the direction of gravity beneath the transport means of the feed device, with the exception of the at least one support arm, no further components of the frame and/or of the conveying apparatus are arranged.

In some embodiments, the frame forms a housing, and the holder and/or the at least one electronic component lies, in the operating position, mostly, in particular fully, within the housing and/or, in the maintenance position, mostly, in particular fully, outside the housing.

Various embodiments provide a labeling apparatus having a conveying apparatus for transporting individual products, as described herein, and having an applicator for applying labels to the respective product.

BRIEF DESCRIPTION OF THE DRAWINGS

There are now a large number of possibilities for configuring and refining the conveying apparatus according to the disclosure and the labeling apparatus according to the disclosure. For this, reference should be made to the description of illustrative embodiments in conjunction with the drawings. In the drawings:

FIG. 3 shows a top view of a conveying apparatus according to FIG. 2.

DETAILED DESCRIPTION

Figure 1A:
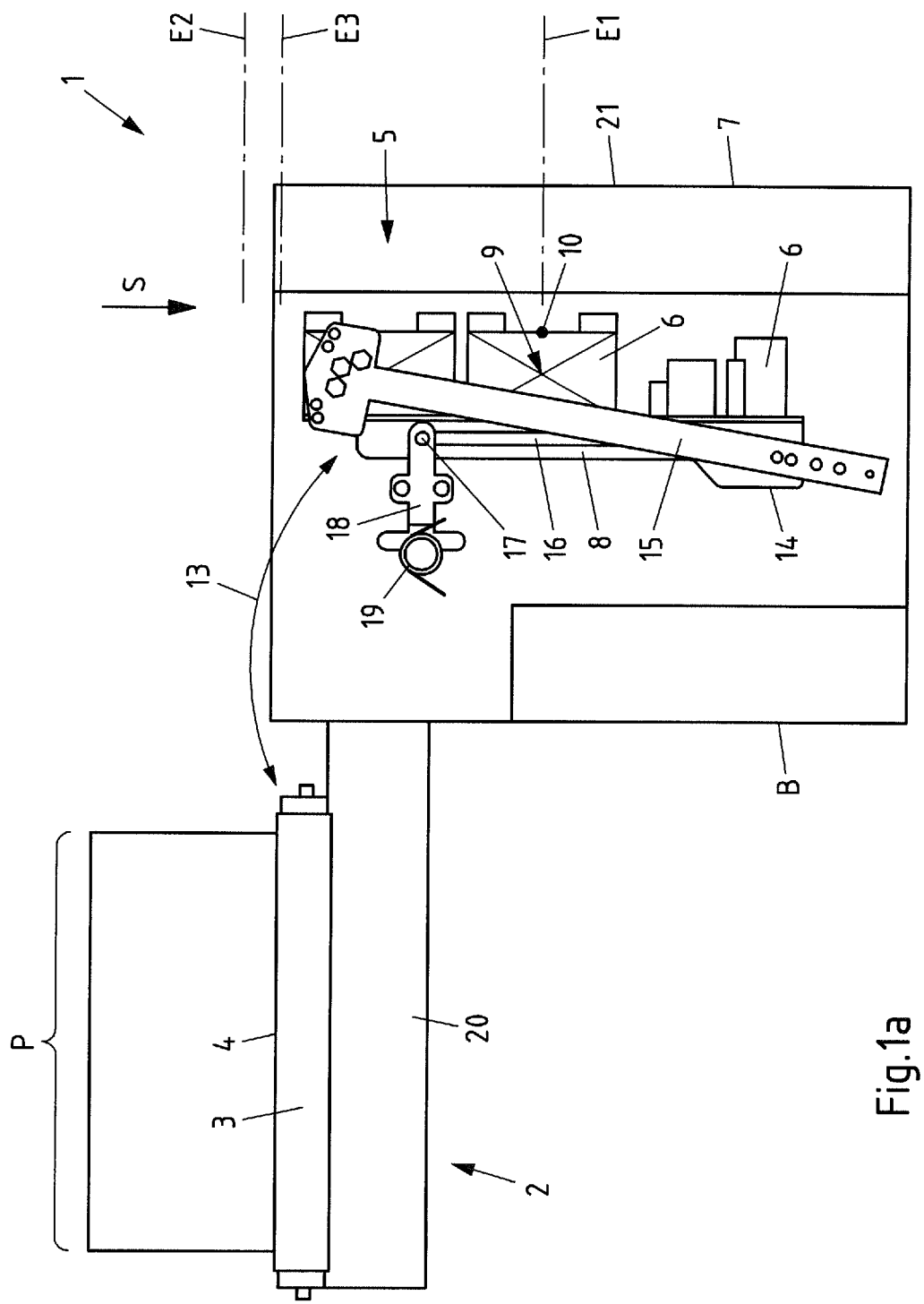
FIG. 1a)-1c) show a schematic representation of a conveying apparatus having a moving holder.
Figure 2:
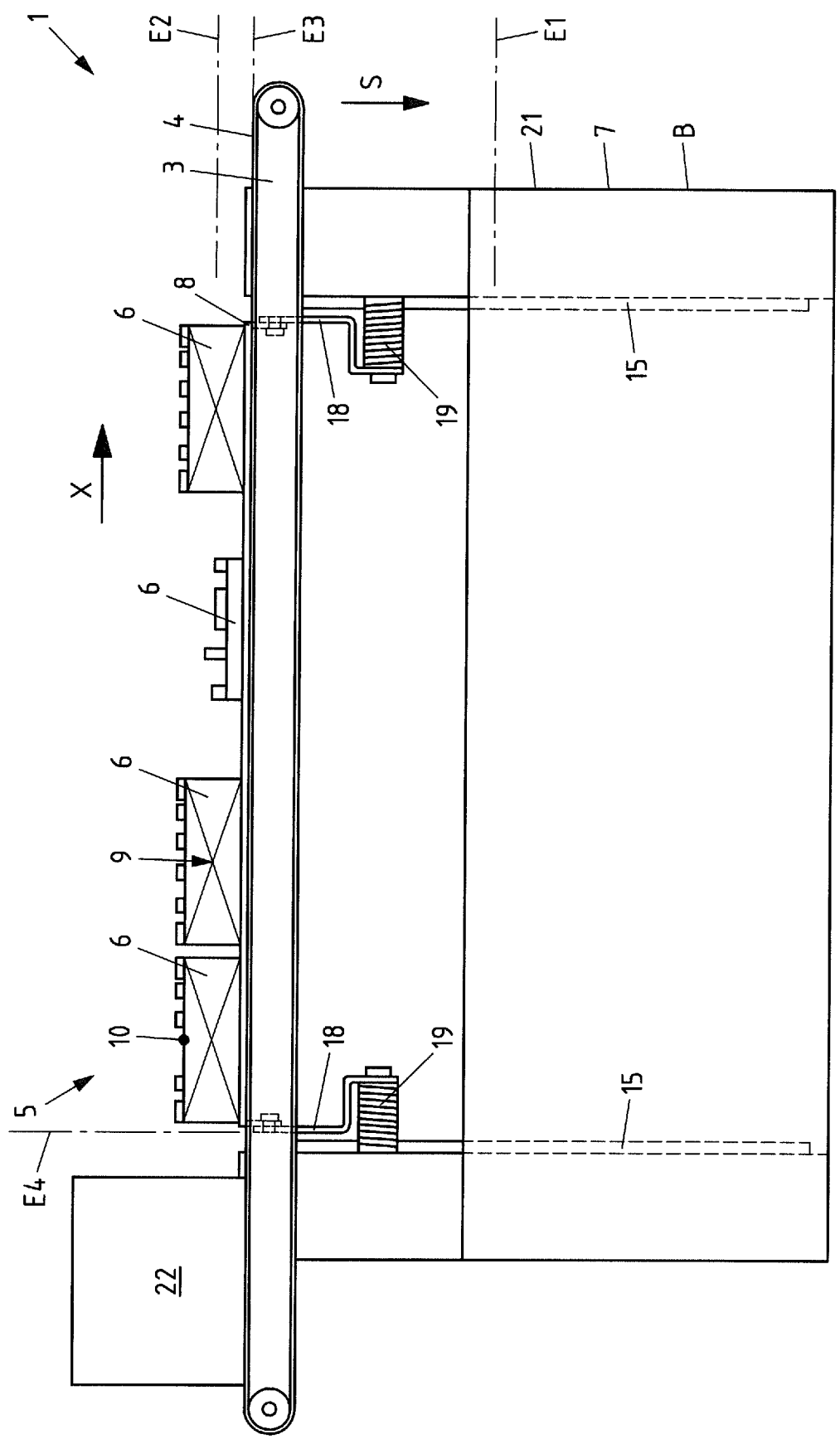
FIG. 2 shows a side view of an illustrative embodiment of a conveying apparatus.

In FIG. 1a)-1c), and also in FIGS. 2 and 3, is respectively represented a conveying apparatus 1 for transporting individual products, which conveying apparatus can be part of a labeling apparatus having an additional applicator 22 for applying a label to the respective product.

The conveying apparatus 1 has a feed device 2, a control device 5 and a frame 7. The feed device 2 has a transport element or transport means 3, here in the form of a conveyor belt, for transporting the respective product (not represented) in a direction of transport X which runs at an angle, here orthogonally, to the direction of gravity S. The transport means 3 has a resting surface 4 (the top side of the conveyor belt) for the respective product.

Figure 1B:
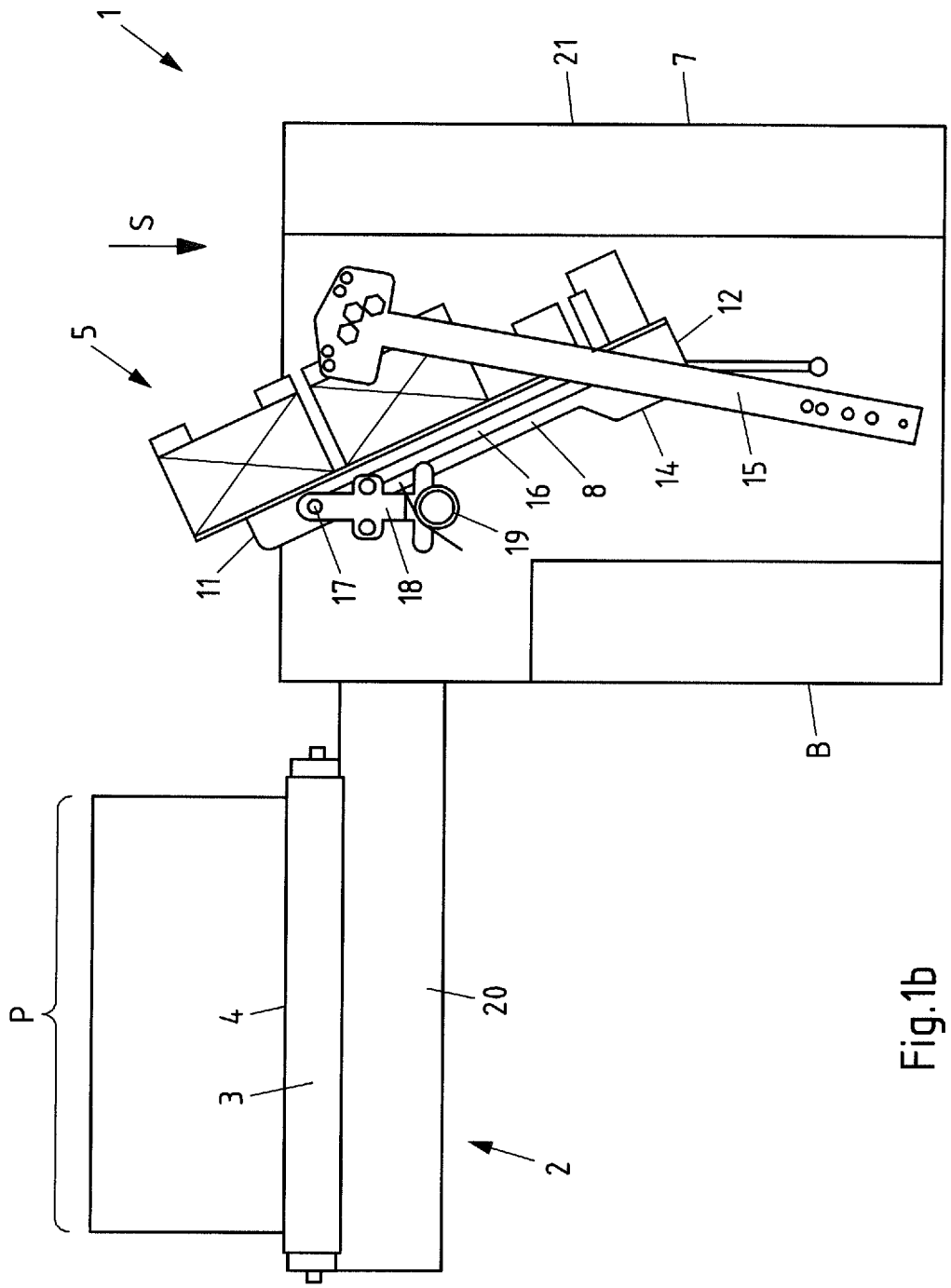
Figure 1C:
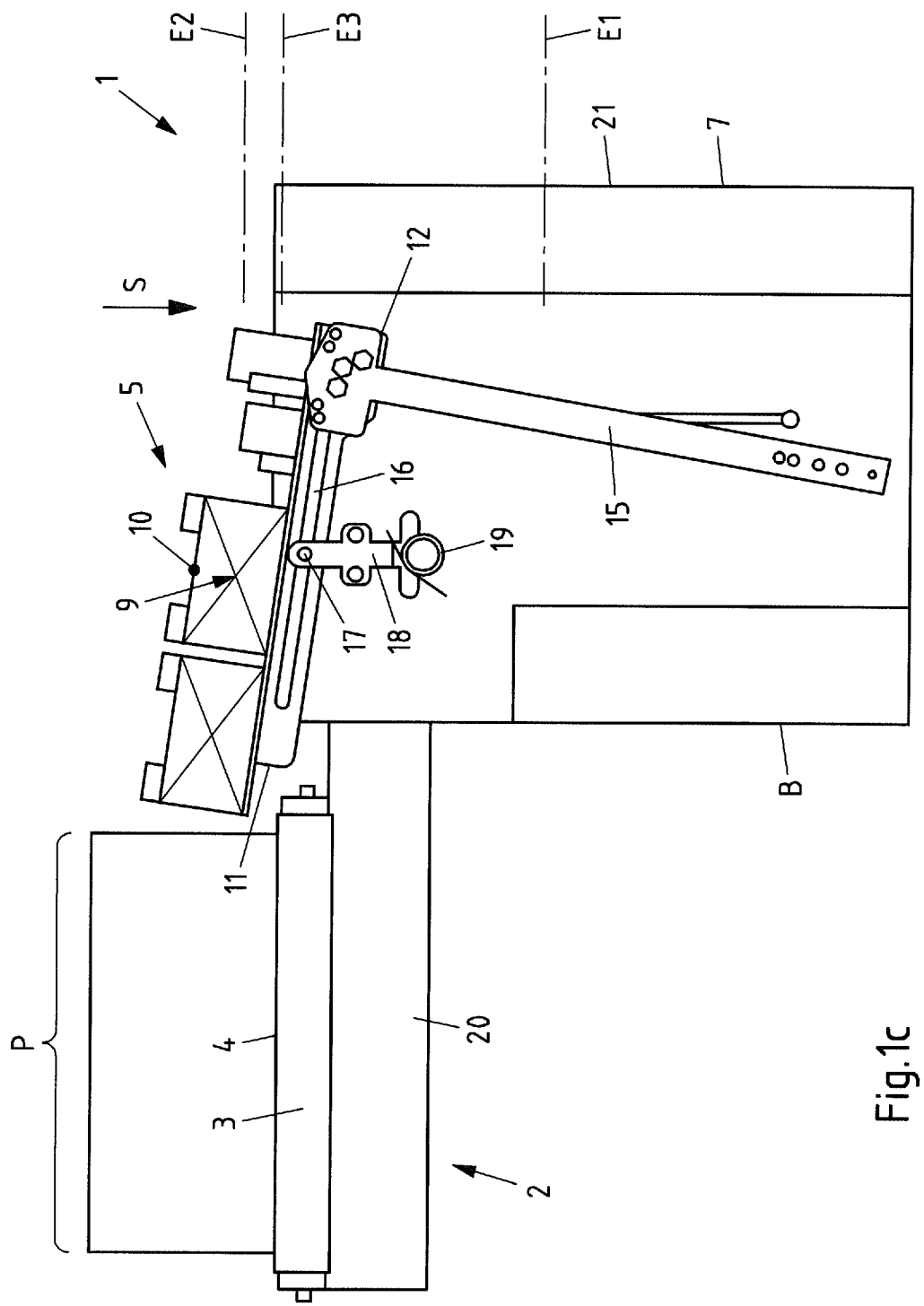

The control device 5 has a plurality of electronic components 6, which are disposed on a holder 8. The holder 8 is movable between an operating position and a maintenance position and bears a plurality of the electronic components 6 of the control device 5. Where mention is made below of the electronic components 6 of the control device 5, always those components which are disposed on the holder 8 are meant. The holder 8, in turn, is borne by the frame 7 and is movably connected thereto. The operating position is represented in FIG. 1a). Here the holder 8 is disposed fully within the outer boundary B of the frame and of the housing 21 formed thereby. FIG. 1b) shows an intermediate position between the operating position and the maintenance position. Here the holder 8, and also one of the electronic components 6, protrudes upward (counter to the direction of gravity S) from the outer boundary B of the frame or from the housing 21. FIG. 1c) shows a further intermediate position, which lies already very close to the maintenance position. In this position, the holder 8 and the electronic components 6 lie mostly outside the outer boundary B of the frame 7 or outside the housing 21. Finally, the final maintenance position is represented in FIGS. 2 and 3, wherein here the holder 8 and all top-side electronic components 6 protrude on the outer boundary B of the frame 7 or from the housing 21.

In the conveying apparatus 1, it is fundamentally important that the electronic component or components 6 are ready for operation, that is to say fully functional, not only in the operating position of the holder 8, but also in the maintenance position.

The holder 8 is guided in the frame 7 such that the center of gravity 9 of at least one of the electronic components 6 (which are connected to the holder) lies, in the operating position, in a first (horizontal) plane $E_1$ orthogonal to the direction of gravity S, and, in the maintenance position, in a second (horizontal) plane $E_2$ orthogonal to the direction of gravity S, which second plane is distanced from the first plane $E_1$ counter to the direction of gravity S, i.e. vertically. The same applies also to the midpoint 10 of that surface of at least one of the electronic components 6 which is facing away from the holder 8, which midpoint lies, in the operating position, in the same first horizontal plane $E_1$ and lies, in the maintenance position, in a second plane vertically distanced therefrom (not represented for reasons of clarity). The electronic components 6 connected to the holder 8 lie, in the maintenance position, fully vertically above a plane $E_3$ which is orthogonal to the direction of gravity S and in which runs the resting surface 4 of the transport means 3. Moreover, the maintenance position is here chosen such that the holder 8 and the electronic components 6 lie outside the vertical projection P of the resting surface 4 of the transport means 3, which projection faces counter to the direction of gravity S. The shortest horizontal distance between holder 8 and projection P here amounts in the maintenance position, by way of example, to 0 mm, that is to say the holder 8, in the maintenance position, adjoins the projection P.

In order to reach the previously described maintenance position when starting from the operating position shown in FIG. 1a), the holder 8 is articulately connected to and guided on the frame 7 via two axes parallel to the direction of transport X. The axes are defined by elements which engage in corresponding guides 15 and 16, which are described below.

Thus the holder 8 is guided with its lower half 14 in a completely straight-running guide 15 in the form of a guide rail. The guide 15 is connected immovably to the frame 7. At the same time the holder 8 has a guide 16, which likewise runs completely straight and is formed by a guide slot. In the guide slot 16, a ball-bearing roller is guided as the guide counterpart 17. The guide counterpart 17 or said roller is pivotably connected to the frame 7 via a lever 18. The lever 18 is in turn pretensioned in the direction from the operating position to the maintenance position by means of a spring 19.

The previously described mounting of the holder 8 via the two guide devices enables the holder to be moved in a quite specific manner in a translational and pivotable motion, such that the holder 8, in the maintenance position, is in the present illustrative embodiment shifted by an angle of 90° in relation to the operation position. The previously described particular mounting of the holder 8 allows the front end 11 and/or rear end 12 of the holder 8 to be moved between the operating position and the maintenance position along a motional path 13 which has at least one curved and/or at least one straight portion, wherein the motional path 13 runs in particular in a plane $E_4$ which runs parallel to the direction of gravity S and orthogonally to the direction of transport X. The motional path 13 of the front end 11 and the motional path 13 of the rear end 12 are here chosen such that, in the maintenance position, the holder 8 with the electronic components 6 lies closer to the transport means 3 than in the operating position.

As can be seen, in particular, from FIGS. 1a) to 1c), the frame 7 has at least one support arm 20, more precisely two support arms 20, which run forward from the rest of the frame. On the support arms 20, the transport means 3 is mounted. Beneath the transport means 3 are found, with the exception of the support arms 20, no further components, neither of the frame 7, nor of the rest of the conveying apparatus 1. Rather, a free air space is provided here.

The following is a listing of reference numbers and corresponding element names:
1 conveying apparatus
2 feed device
3 transport means
4 resting surface
5 control device
6 electronic component
7 frame
8 holder
9 center of gravity of the electronic component
10 midpoint of the component surface facing away from the holder
11 front end of the holder
12 rear end of the holder
13 motional path of the front and/or rear end
14 rear half of the holder
15 guide
16 guide
17 guide counterpart
18 lever
19 spring
20 support arm
21 housing
22 applicator
X direction of transport
S direction of gravity
B outer boundary of the frame
P vertical projection of the resting surface
$E_1$-$E_4$ planes

The invention claimed is:

1. A conveying apparatus for transporting individual products, comprising:
   a feed device comprising a transport element for transporting the respective product in a direction of transport which runs at an angle to the direction of gravity, wherein the transport element has a resting surface for the respective product;
   a control device comprising at least one electronic component; and
   a frame bearing a holder which is movable between an operating position and a maintenance position and which bears at least one electronic component;
   wherein the at least one electronic component, in the operating position of the holder, is ready for operation;
   wherein the at least one electronic component is ready for operation also in the maintenance position;
   wherein, in the vertical direction, the maintenance position is higher than the operating position; and
   wherein the at least one electronic component lies, in the operating position, primarily vertically below an upper plane which is orthogonal to the direction of gravity and which is coplanar to the resting surface of the transport element of the feed device.

2. The conveying apparatus as claimed in claim 1, wherein a center of gravity and/or a midpoint of a surface of the at least one electronic component which is facing away from the holder lies, in the operating position, respectively in a first plane orthogonal to the direction of gravity and, in the maintenance position, respectively in a second plane orthogonal to the direction of gravity, which second plane is distanced from the respectively first plane counter to the direction of gravity.

3. The conveying apparatus as claimed in claim 1, wherein the holder and/or the at least one electronic component lies, in the operating position, mostly within an outer boundary of the frame and/or, in the maintenance position, mostly outside the outer boundary of the frame.

4. The conveying apparatus as claimed in claim 1, wherein the at least one electronic component lies, in the maintenance position, mostly vertically above the upper plane which is orthogonal to the direction of gravity and in which runs parallel to the resting surface of the transport element of the feed device.

5. The conveying apparatus as claimed in claim 1, wherein the holder and/or the at least one electronic component lies, in the maintenance position, outside a projection of the resting surface of the transport element of the feed device which faces counter to the direction of gravity, the shortest horizontal distance between the holder and the projection being less than 150 mm.

6. The conveying apparatus as claimed in claim 1, wherein the holder and/or the at least one electronic component, in the maintenance position, lies closer to the transport element than in the operating position.

7. The conveying apparatus as claimed in claim 1, wherein the holder is translationally movable and/or pivotable and in the maintenance position, is shifted by an angle of 75-105° in relation to the operating position.

8. The conveying apparatus as claimed in claim 1, wherein a front end and/or a rear end of the holder is movable between the operating position and the maintenance position along a motional path which has at least one curved and/or at least one straight portion, wherein the motional path runs in particular in a plane which runs parallel to the direction of gravity and orthogonally to the direction of transport.

9. The conveying apparatus as claimed in claim 1, wherein the holder is guided with its rear half, in at least one guide.

10. The conveying apparatus as claimed in claim 9, wherein the guide is connected immovably to the frame.

11. The conveying apparatus as claimed in claim 1, wherein the holder has at least one guide in which a guide counterpart is guided.

12. The conveying apparatus as claimed in claim 11, wherein the guide counterpart is connected movably to the frame.

13. The conveying apparatus as claimed in claim 12, wherein the guide counterpart is a pin or a roller, which is connected to the frame via a lever.

14. The conveying apparatus as claimed in claim 13, wherein a spring acts on the guide counterpart and/or the lever and/or the holder and pretensions the guide counterpart or the lever or the holder in the direction from the operating position to the maintenance position or counter to the direction of gravity.

15. The conveying apparatus as claimed in claim 12, wherein the guide counterpart is connected pivotably to the frame.

16. The conveying apparatus as claimed in claim 1, wherein the frame has at least one support arm, which bears the transport element of the feed device.

17. The conveying apparatus as claimed in claim 16, wherein in the direction of gravity beneath the transport element of the feed device, with the exception of the at least one support arm, no further components of the frame and/or of the conveying apparatus are arranged.

18. The conveying apparatus as claimed in claim 1, wherein the frame forms a housing, and the holder and/or the at least one electronic component lies, in the operating position, mostly within the housing and/or, in the maintenance position, mostly outside the housing.

19. A labeling apparatus, comprising:
a conveying apparatus for transporting individual products, as claimed in claim 1, and
an applicator for applying labels to the respective product.

20. The conveying apparatus as claimed in claim 1, wherein the holder and/or the at least one electronic component lies, in the maintenance position, outside a projection of the resting surface of the transport element of the feed device which faces counter to the direction of gravity, the shortest horizontal distance between the holder and the projection being less than 50 mm.

* * * * *